United States Patent

Press

[15] 3,636,381

[45] Jan. 18, 1972

[54] TRANSISTORIZED LOAD CONTROL CIRCUIT COMPRISING HIGH- AND LOW-PARALLEL VOLTAGE SOURCES

[72] Inventor: Meyer Press, Sharon, Mass.

[73] Assignee: GTE Sylvania Incorporated

[22] Filed: Feb. 16, 1971

[21] Appl. No.: 115,529

[52] U.S. Cl. ................................307/296, 307/43, 307/242, 307/243, 307/254

[51] Int. Cl. ..........................................H03k 1/02, H02j 1/10

[58] Field of Search ..................307/43, 44, 64, 75, 242, 243, 307/254, 296, 297; 328/213

[56] References Cited

UNITED STATES PATENTS

| | | | |
|---|---|---|---|
| 3,192,403 | 6/1965 | Bernfeld et al | 307/296 X |
| 3,226,574 | 12/1965 | Winkler | 307/292 X |

*Primary Examiner*—Stanley D. Miller, Jr.
*Attorney*—Norman J. O'Malley, Elmer J. Nealon and Peter Xiarhos

[57] ABSTRACT

A transistorized load control circuit including first and second transistors for supplying current to a load circuit from a high-voltage source or from a low-voltage source. The base of the first transistor is connected to an input terminal, the collector is connected to the high-voltage source, and the emitter is connected through a first diode to the collector of the second transistor and also through a second diode to the base of the second transistor. The collector of the second transistor is connected through a third diode to the low-voltage source and the emitter is connected to a load circuit. When a predetermined first control voltage condition is present at the input terminal, current is supplied to the load circuit from the low-voltage source via a current path including the third diode and the second transistor. When a predetermined second control voltage condition is present at the input terminal, current is supplied to the load circuit from the high-voltage source via a current path including the first transistor, the first diode, and the base-emitter circuit of the second transistor and also via a current path including the second diode. During operation of the load control circuit, the base-emitter circuit of the second transistor is prevented from receiving and conducting excessive values of current.

6 Claims, 1 Drawing Figure

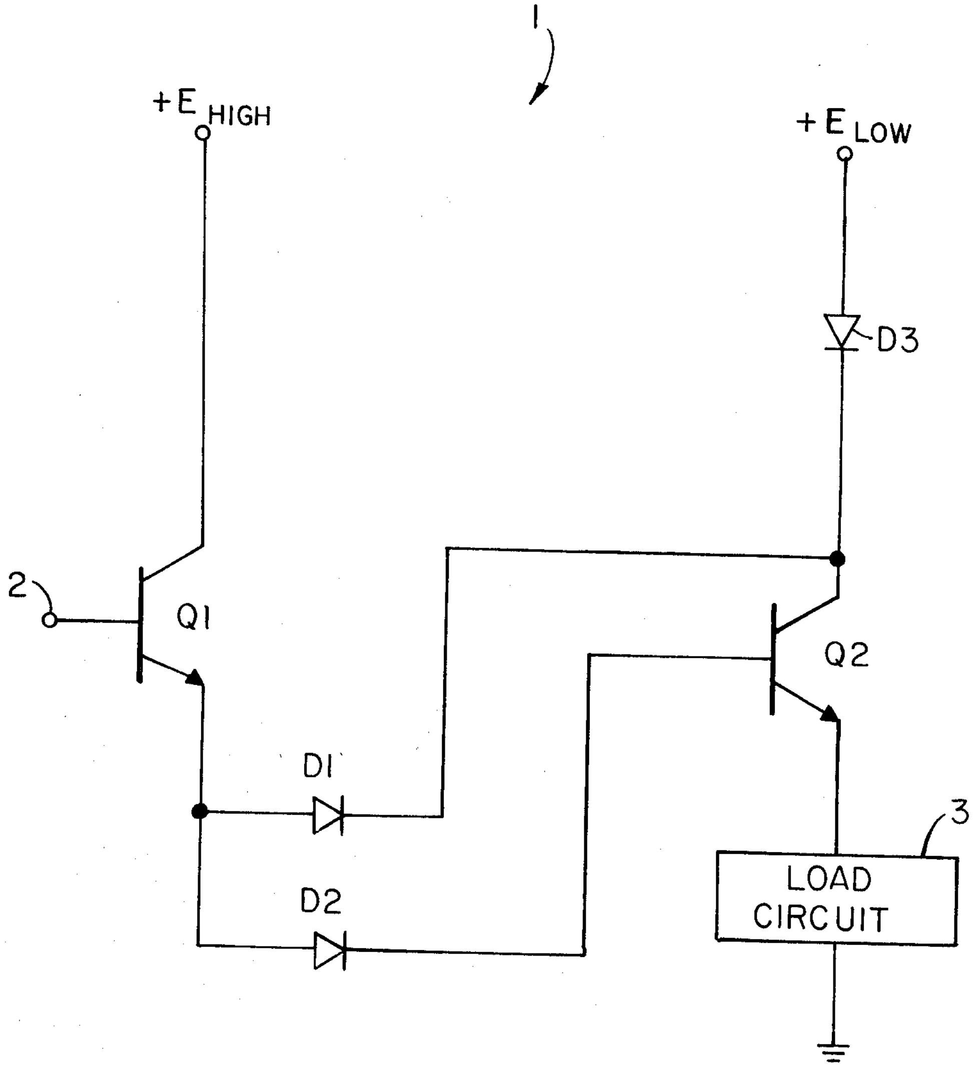
INVENTOR
MEYER PRESS

TRANSISTORIZED LOAD CONTROL CIRCUIT COMPRISING HIGH- AND LOW-PARALLEL VOLTAGE SOURCES

BACKGROUND OF THE INVENTION

The present invention relates to a load control circuit. More particularly, it is concerned with a simple and inexpensive transistorized load control circuit for supplying current to a load circuit from either a first voltage source or a second voltage source.

It is often desirable or required to supply current to a load circuit from a first voltage source, for example, a low-voltage source, and, at a predetermined time, from a second voltage source. Although a variety of circuits and arrangements capable of performing the above general or equivalent function are generally available and known to those skilled in the art, for example, so-called "voltage-on-demand" circuits, they are often undesirably complex, slow in operation, inefficient, or costly. The present invention is directed to a load control circuit which avoids the above-mentioned disadvantages and shortcomings associated with prior art load control circuits and arrangements.

BRIEF SUMMARY OF THE INVENTION

In accordance with the present invention, a load control circuit is provided for supplying current to a load circuit from a first source of potential or from a second source of potential. The load control control circuit includes a first transistor and a second transistor. The base of the first transistor is coupled to an input terminal of the load control circuit and the collector is coupled to the first source of potential. A first diode means, having a conducting state and a nonconducting state, is connected in series with the emitter of the first transistor and the collector of the second transistor, and a second diode means, having a conducting state and a nonconducting state, is connected in series with the emitter of the first transistor and the base of the second transistor. A third diode means, also having a conducting state and a nonconducting state, is connected in series with the collector of the second transistor and the second source of potential. A load circuit to be operated by the load control circuit is connected in series with the emitter of the second transistor and a source of reference potential.

In the operation of the load control circuit, the second transistor operates in a conducting state, the first diode means operates in its nonconducting state, and the second and third diode means operate in their conducting states in response to a first input control voltage condition at the input terminal. With the above operating states for the second transistor and the first, second, and third diode means, current is supplied from the second source of potential to the load circuit via the conducting third diode means and the conducting second transistor. In response to a second input control voltage condition at the input terminal, the first transistor operates in a conducting state, the first and second diode means operate in their conducting states, and the third diode means operates in its nonconducting state. With these particular operating states for the first transistor and the first, second, and third diode means, current is supplied from the first source of potential to the load circuit via the conducting first transistor, the first diode means, and the collector-emitter circuit of the second transistor.

BRIEF DESCRIPTION OF THE DRAWING

The single FIGURE of the drawing illustrates a transistorized load control circuit in accordance with a preferred embodiment of the invention.

GENERAL DESCRIPTION OF THE INVENTION

Referring now to the single figure of the drawing, there is shown a load control circuit 1 in accordance with a preferred embodiment of the invention. The load control circuit 1 generally comprises a pair of NPN-transistors Q1 and Q2, a positive high-voltage source $+E_{HIGH}$, a positive low-voltage source $+E_{LOW}$, and diodes D1, D2, and D3. The base of the transistor Q1 is connected directly to an input control terminal 2 to which a control voltage is applied for operating the load control circuit 1. The collector of the transistor Q1 is connected directly to the positive high-voltage source $+E_{HIGH}$, and the emitter is coupled to the collector of the transistor Q2 through the diode D1 and also to the base of the transistor Q2 through the diode D2. As indicated in the FIGURE, the anodes of the diodes D1 and D2 are connected in common to the emitter of the transistor Q1 and the cathodes of the diodes D1 and D2 are connected to the collector and emitter, respectively, of the transistor Q2. In addition to the above circuit connections, the collector of the transistor Q2 is connected to the cathode of the diode D3, the anode of which is connected to the positive low-voltage source $+E_{LOW}$, thereby establishing a direction of easy current flow between the low-voltage source $+E_{LOW}$ and the collector of the second transistor Q2. A load circuit 3 to be operated by the load control circuit 1 is connected between the emitter of the transistor Q2 and ground reference potential.

By way of an example of a typical application of the load control circuit 1 of the invention, the load circuit 3 may include a series arrangement of an inductive load element and a resistive load element as is commonly employed, for example, in magnetic deflection circuits for cathode-ray tubes.

OPERATION

In the operation of the load control circuit 1, a positive control voltage for causing the load control circuit 1 to supply current to the load circuit 3 from either the low-voltage source $+E_{LOW}$ or the high-voltage source $+E_{HIGH}$ is applied to the input control terminal 2. The particular one of the two voltage sources $+E_{LOW}$ and $+E_{HIGH}$ which it is desired to supply current to the load circuit 3 is determined by the value of the control voltage established at the input control terminal 2. More specifically, and as will be described more fully hereinafter, if it is desired to supply current to the load circuit 3 from the low-voltage source $+E_{LOW}$, a value of control voltage is established at the input control terminal 2 which is sufficient to forward bias the base-emitter junctions of both of the transistors Q1 and Q2 but, as may be determined from the FIGURE, less than $$e_c = e_{+E_{LOW}} + e_{beQ1} + e_{D1} - e_{D3}$$

where $e_{+E_{LOW}}$ is the value of the low-voltage source $+E_{LOW}$, $e_{beQ1}$ is the value of the forward-bias base-emitter voltage of the transistor Q1 (typically 0.7 volts), $e_{D1}$ is the value of the forward-bias voltage of the diode D1 (typically 0.7 volts), and $e_{D3}$ is the value of the forward-bias voltage of the diode D3 (typically 0.7 volts). (Thus, the value of the expression ($+e_{beQ1} + e_{D1} - e_{D3}$) has a typical value of 0.7 volts). If it is desired to supply current to the load circuit 3 from the high-voltage source $+E_{HIGH}$ instead of the low-voltage source $+E_{LOW}$, a value of control voltage is established at the input control terminal 2 which is equal to or greater than $e_C$. A more detailed explanation of the "low-voltage" and "high-voltage" operation of the load control circuit 1 is as follows.

LOW-VOLTAGE OPERATION

To supply current to the load circuit 3 from the low-voltage source $+E_{LOW}$, a control voltage is established at the input control terminal 2 having a value sufficient to forward bias both of the transistors Q1 and Q2 into their conducting state but, as stated hereinabove, less than $$e_c = e_{+E_{LOW}} + e_{beQ1} + e_{D1} - e_{D3}.$$

The minimum value of control voltage required to achieve conduction in both of the transistors Q1 and Q2 is equal to the combined values of the forward-bias base-emitter voltage of the transistor Q1, the forward-bias voltage of the diode D2, and the forward-bias base-emitter voltage of the transistor Q2. With the transistors Q1 and Q2 operating in their conducting states, the diode D3 is forward biased into its conducting state and current is supplied from the low-voltage source $+E_{LOW}$ through the diode D3 and the conducting transistor Q2 into the load circuit 3. It is to be noted that no current is supplied to the load circuit 3 via the diode D1 inasmuch as the diode D1 is reverse biased at this time by the positive voltage at the collector of the transistor Q2. Thus, the current supplied to the load circuit 3 during "low-voltage" operation is derived from the low-voltage source $+E_{LOW}$.

HIGH-VOLTAGE OPERATION

To supply current to the load circuit 3 from the high-voltage source $+E_{HIGH}$, a control voltage is established at the input control terminal 2 having a value equal to or greater than $e_C$. Assuming a value of control voltage equal to or greater than $e_c$, the transistors Q1 and Q2 are forward biased into their conducting states, the diode D1 is caused to be forward biased into its conducting state, and the diode D3 is caused to be reverse biased in its nonconducting state via the forward-biased diode D1. As a result, the low-voltage source $+E_{LOW}$ is prevented by the reverse-biased diode D3 from supplying current to the load circuit 3, and current is now supplied to the load circuit 3 from the high-voltage source $+E_{HIGH}$. More specifically, current is supplied to the load circuit 3 via a current path including the conducting transistor Q1, the diode D1, and the collector-emitter circuit of the conducting transistor Q2, and also, to a considerably lesser degree, via a current path including the conducting transistor Q1, the diode D2 and the base-emitter junction of the conducting transistor Q2. With the particular arrangement of elements shown in the FIGURE, particularly the interconnections of the diode D1 and D2 with the transistors Q1 and Q2, the transistor Q2 is prevented from operating in its saturation state, thereby limiting the current into the base of the transistor Q2 (via the diode D2) to a safe value. If the value of the control voltage is increased to a value greater than $e_c$, the current flow into the base of the transistor Q2 (via the diode D2) remains at a safe value while increased current is supplied to the load circuit 3 via the diode D1 and the collector-emitter circuit of the transistor Q2. In this fashion, current flow through the base-emitter junction of the transistor Q2 is prevented from reaching an excessive value. If for a particular application of the load control circuit 1 it is desired to have a large value of collector-emitter voltage for the transistor Q2, such that the transistor Q2 is farther removed from its saturation state than in the case of the particular arrangement shown in the figure, additional diodes may be placed in series with the diode D2, in a series aiding fashion, to any degree desired.

Some typical values for the parameters of the components employed in the above-described load control circuit 1 are as follows:

| | |
|---|---|
| $+E_{HIGH}$ | 50 volts DC |
| $+E_{LOW}$ | 10 volts DC |
| Q1 | 2N 3055 |
| Q2 | 2N 3055 |
| D1 | 1N 4383 |
| D2 | 1N 4383 |
| D3 | 1N 4383 |

While there has been shown and described what is considered a preferred embodiment of the invention, it will be obvious to those skilled in the art that various changes and modifications may be made therein without departing from the invention as called for in the appended claims.

What is claimed is:

1. A load control circuit for operating a load circuit, comprising:
an input terminal for receiving input control voltage conditions:
a first source of potential;
a second source of potential;
a source of reference potential;
a first transistor having base, collector, and emitter, the base being coupled to the input terminal and the collector being coupled to the first source of potential;
a second transistor having base, collector, and emitter;
first diode means connected in series with the emitter of the first transistor and the collector of the second transistor, said first diode means having a conducting state and a nonconducting state;
second diode means connected in series with the emitter of the first transistor and the base of the second transistor, said second diode means having a conducting state and a nonconducting state;
third diode means connected in series with the collector of the second transistor and the second source of potential, said third diode means having a conducting state and a nonconducting state;
means for connecting a load circuit in series with the emitter of the second transistor and the source of reference potential;
said second transistor being operable in a conducting state, said first diode means being operable in its nonconducting state, and said second and third diode means being operable in their conducting states in response to a first input control voltage condition at the input terminal, whereby current is supplied from the second source of potential to the load circuit via the conducting third diode means and the conducting second transistor; and
said first transistor being operable in a conducting state, said first and second diode means being operable in their conducting states, and said third diode means being operable in its nonconducting state in response to a second input control voltage at the input terminal, whereby current is supplied from the first source of potential to the load circuit via the conducting first transistor, the first diode means, and the collector-emitter circuit of the second transistor.

2. A load control circuit in accordance with claim 1 wherein:
the first input control voltage condition forward biases the second diode means and the base-emitter junction of the second transistor; and
the second input control voltage condition forward biases the base-emitter junction of the first transistor and the first and second diode means.

3. A load control circuit in accordance with claim 1 wherein:
the first source of potential is a positive high-voltage source;
the second source of potential is a positive low-voltage source;
the source of reference potential provides a potential which is negative with respect to the low-voltage source;
the first and second transistors are NPN-transistors;
the first diode means comprises a diode having its anode coupled to the emitter of the first transistor and its cathode coupled to the collector of the second transistor;
the second diode means comprises a diode having its anode coupled to the emitter of the first transistor and its cathode coupled to the base of the second transistor; and
the third diode means comprises a diode having its anode coupled to the second source of potential and its cathode coupled to the collector of the second transistor.

4. A load control circuit in accordance with claim 1 wherein:
the first source of potential is a positive high-voltage source;
the second source of potential is a positive low-voltage source;
the source of reference potential provides a potential which is negative with respect to the low-voltage source;
the first and second transistors are NPN-transistors
the first diode means comprises a diode having its anode coupled to the emitter of the first transistor and its cathode coupled to the collector of the second transistor;

the second diode means comprises a plurality of diodes connected in a series aiding arrangement, the anode of the first one of the plurality of diodes being coupled to the emitter of the first transistor and the cathode of the last one of the plurality of diodes being coupled to the base of the second transistor; and the third diode means comprises a diode having its anode coupled to the second source of potential and its cathode coupled to the collector of the second transistor.

5. A load control circuit for operating a load circuit, comprising:

an input terminal for receiving input control voltages:

a high-voltage source;

a low-voltage source;

a source of reference potential;

a first transistor having base, collector, and emitter, the base being connected directly to the input terminal and the collector being connected directly to the high-voltage source;

a second transistor having base, collector, and emitter;

a first diode connected in series with the emitter of the first transistor and the collector of the second transistor, said first diode being poled for easy current flow between the emitter of the first transistor and the collector of the second transistor;

a second diode connected in series with the emitter of the first transistor and the base of the second transistor, said second diode being poled for easy current flow between the emitter of the first transistor and the base of the second transistor;

a third diode connected in series with the high-voltage source and the collector of the second transistor, said third diode being poled for easy current flow between the high-voltage source and the collector of the second transistor;

said load circuit being adapted to be connected in series with the emitter of the second transistor and the source of reference potential;

said second transistor and said second and third diodes being operable in their conducting states and said first diode being operable in its nonconducting state in response to a control voltage at the input terminal having a value equal to the sum of the values of the forward-bias base-emitter voltage of the first transistor, the forward-bias voltage of the second diode, and the forward-bias base-emitter voltage of the second transistor—but less than the value of the low-voltage source, plus the value of the forward-bias base-emitter voltage of the first transistor, plus the value of the forward-bias voltage of the first diode, minus the value of the forward-bias voltage of the third diode—whereby current is supplied from the low-voltage source to the load circuit via the conducting third diode and the conducting second transistor, and said first transistor and said first and second diodes being operable in their conducting states and said third diode being operable in its nonconducting state in response to a control voltage at the input terminal having a value equal to or greater than the value of the low-voltage source, plus the value of the forward-bias base-emitter voltage of the first transistor, plus the value of the forward-bias voltage of the first diode, minus the value of the forward-bias voltage of the third diode, whereby current is supplied from the high-voltage source to the load circuit via the conducting first transistor, the conducting first diode, and the collector-emitter circuit of the second transistor.

6. A load control circuit in accordance with claim 5 wherein:

the high-voltage and low-voltage sources are positive voltage sources:

the first and second transistors are NPN-transistors and the source of reference potential is ground potential.

* * * * *